No. 681,948. Patented Sept. 3, 1901.
J. W. BROWN.
RIDING PLOW.
(Application filed Dec. 26, 1900.)
(No Model.) 3 Sheets—Sheet 1.
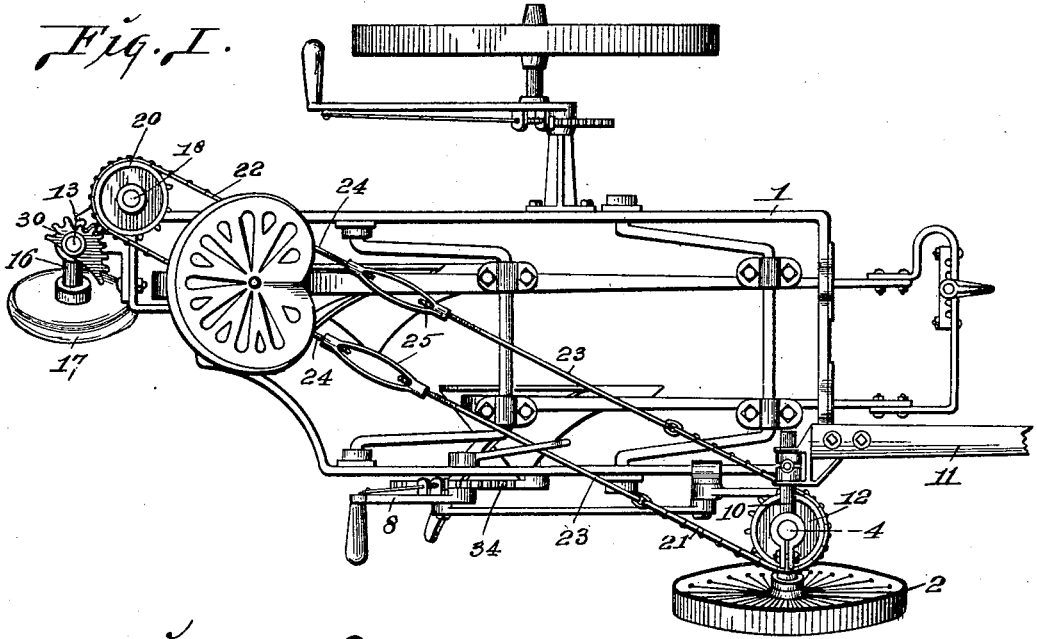
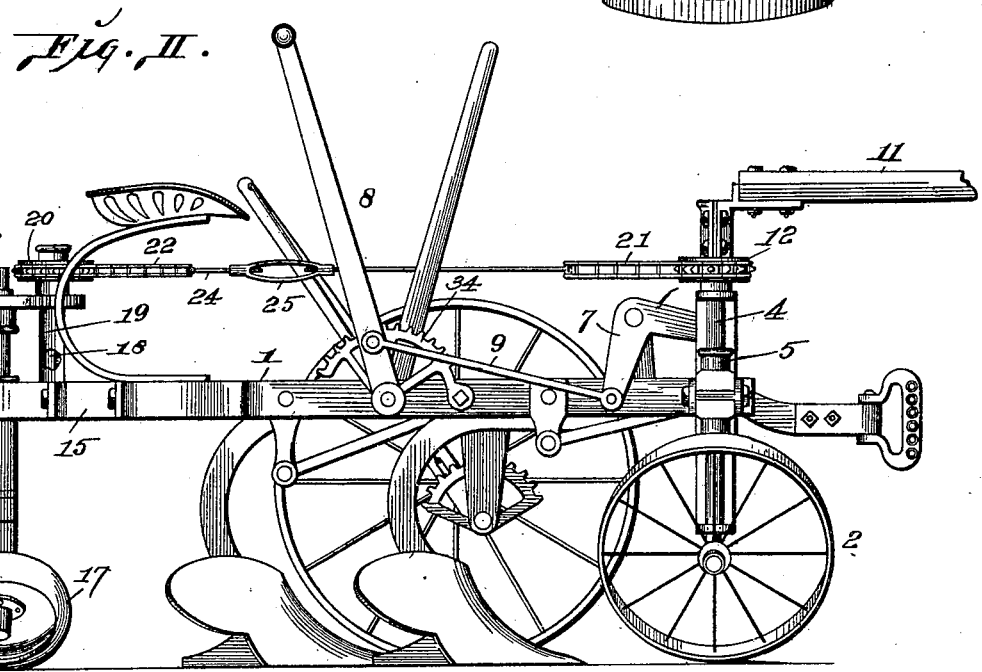

No. 681,948. Patented Sept. 3, 1901.
J. W. BROWN.
RIDING PLOW.
(Application filed Dec. 26, 1900.)
(No Model.) 3 Sheets—Sheet 2.
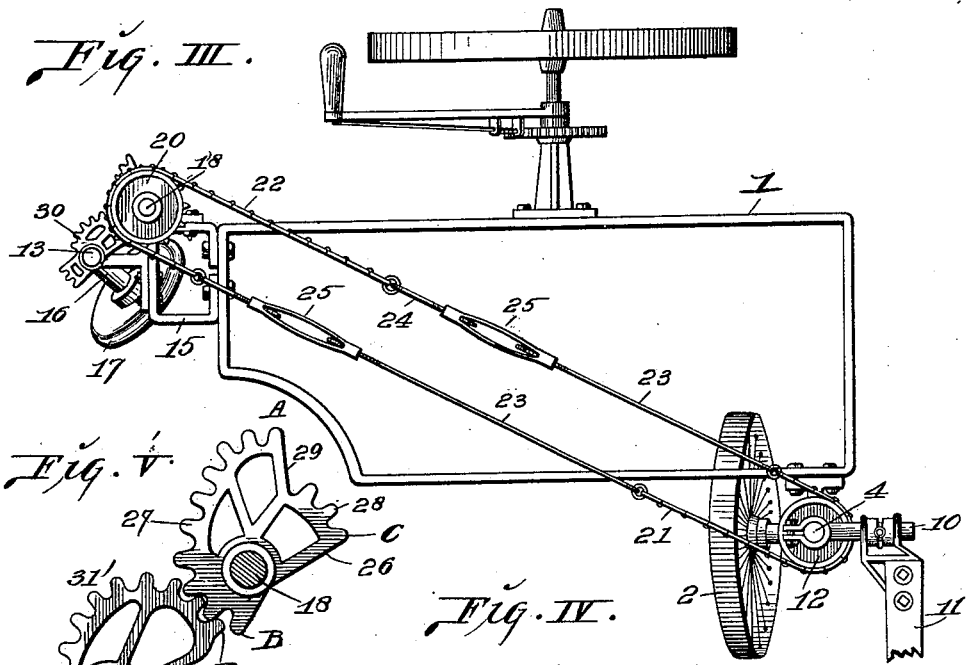
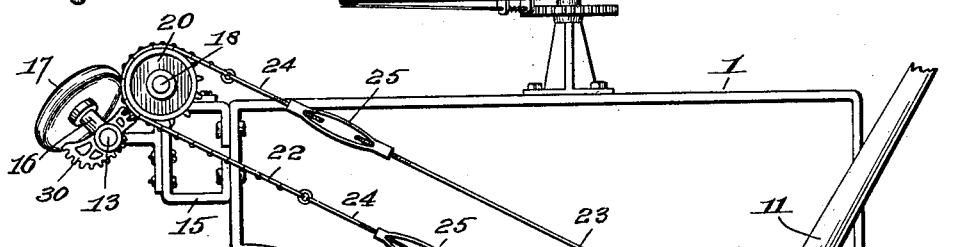
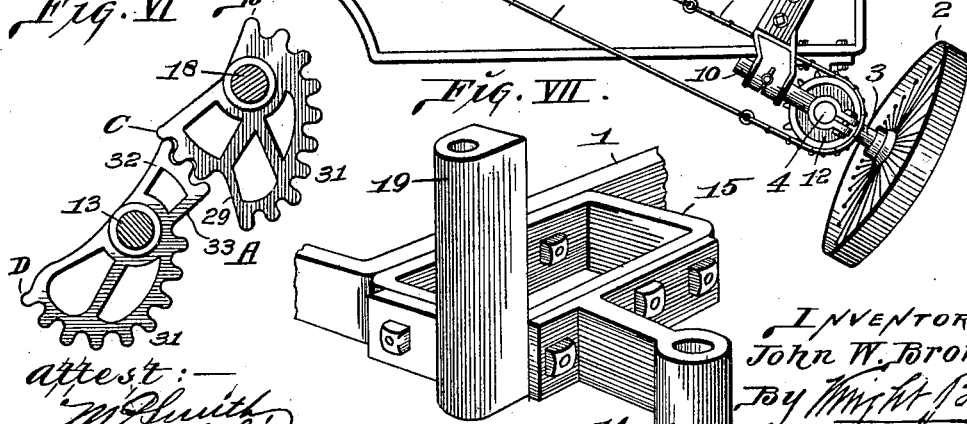
INVENTOR:—
John W. Brown.

No. 681,948. Patented Sept. 3, 1901.
J. W. BROWN.
RIDING PLOW.
(Application filed Dec. 26, 1900.)
(No Model.) 3 Sheets—Sheet 3.
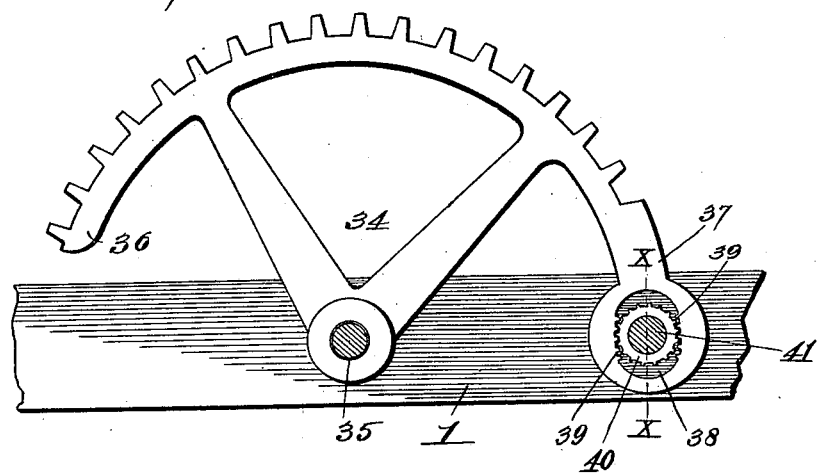
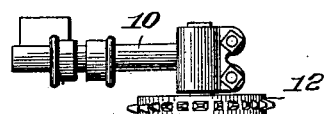
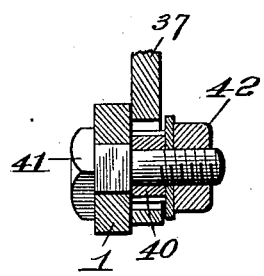
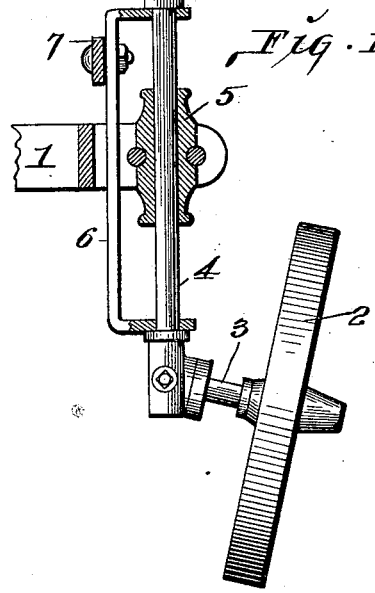
Attest:
W. P. Smith
E. S. Knight
Inventor:
John W. Brown.
By Wright Bro
Atty's

UNITED STATES PATENT OFFICE.

JOHN W. BROWN, OF QUINCY, ILLINOIS, ASSIGNOR TO THE COLLINS PLOW COMPANY, OF SAME PLACE.

RIDING-PLOW.

SPECIFICATION forming part of Letters Patent No. 681,948, dated September 3, 1901.

Application filed December 26, 1900. Serial No. 41,012. (No model.)

*To all whom it may concern:*

Be it known that I, JOHN W. BROWN, a citizen of the United States, residing at Quincy, in the county of Adams and State of Illinois, have invented certain new and useful Improvements in Riding-Plows, of which the following is a full, clear, and exact description, reference being had to the accompanying drawings, forming part of this specification.

My invention relates to a riding-plow, and has for its object to afford a construction wherein in practical use the rear wheel of the plow is given an entirely-different movement in turning the plow to the right from the movement given in turning the plow to the left, whereby the plow may be turned freely in either direction with a resulting free movement of all of the ground-wheels on their journals without either being cramped.

My invention consists in features of novelty hereinafter fully described, and pointed out in the claims.

Figure I is a top or plan view of the plow. Fig. II is a side view. Fig. III is a top view illustrating the positions assumed by the furrow-wheel and the rear wheel in turning the plow to the right. Fig. IV is a similar view to Fig. III, illustrating the positions assumed by the furrow-wheel and the rear wheel in turning the plow to the left. Fig. V is a detail view showing the irregular elliptic cog-gears by which the rear wheel is operated, the gears being shown in the positions assumed in Fig. III. Fig. VI is a similar view to Fig. V of the cog-gears, showing them in the positions assumed in Fig. IV. Fig. VII is an enlarged detail perspective view of the box-support and the boxes in which the shafts that carry the cog-gears are journaled. Fig. VIII is a detail side view of the adjustable toothed segment that receives the engagement of the dog of the plow-lifting lever. Fig. IX is an enlarged detail view of the furrow-wheel and its axle, the bearing-box being shown in vertical section. Fig. X is a sectional view taken on the line X X, Fig. VIII.

1 designates the frame of the plow, to which the plows proper are connected in the ordinary manner.

2 designates the furrow or forward wheel, mounted on the adjustable spindle 3 of an upright axle 4, that is loosely journaled in a bearing-box 5, mounted in the forward end of the frame 1 at the forward right-hand corner thereof. This upright axle has applied to it a yoke 6, that receives the connection of a bell-crank 7, pivotally mounted on the frame 1, and through the medium of which the frame is raised or lowered to lift the plows proper from the ground or lower them thereto. The bell-crank 7 is manipulated by a hand-lever 8, pivoted to the frame 1 and having connection with the bell-crank by a rod 9. No invention *per se* is, however, claimed for the means just described for raising and lowering the plows proper.

10 designates an arm adjustably fixed to the upper end of the upright axle 4 and adapted to receive the attachment of the draft-tongue 11, by which, upon the swinging of the tongue, the upright axle, and consequently the furrow or forward wheel 2, is turned either to the right or left, according to the direction in which the tongue is moved.

Fixed to the axle 4 is a sprocket-wheel 12, reference to which will be hereinafter made.

13 designates an upright axle journaled in a bearing-box 14, carried by a supplemental frame 15, attached to the main frame 1. The axle 13 is provided at its lower end with a spindle 16, that receives the rear wheel 17.

18 designates an upright stub-shaft mounted and arranged to turn in a journal-box 19, carried by the supplemental frame 15. (See Fig. VII.) Fixed to the stub-shaft 18 is a sprocket-wheel 20, preferably of the same size and having the same number of teeth as the sprocket-wheel 12, carried by the upright axle 4 of the forward wheel 2. The sprocket-wheels 12 and 20 are arranged in line with each other horizontally, and the sprocket-wheel 12 receives a chain 21, while the wheel 20 receives a chain 22. The chains 21 and 22 are connected by rods 23 and 24, that are joined by turnbuckles 25. By the use of the turnbuckles 25 the chains 21 and 22 and the rods 23 and 24 may be tightened to the desired degree, and, furthermore, by loosening one of the turnbuckles and tightening the other the relative positions of the wheels 2 and 17 may be altered through the connections between these wheels, as will hereinafter more fully appear.

26 designates a cog-gear fixed to the stub-shaft 18. This gear is irregular in shape and is formed with a section 27, extending from a point A (see Figs. V and VI) and curving inwardly to a point B near the axis of the shaft 18. This gear also has a toothed arm 28, that extends from a straight edge 29 to a point C, the distance between the axis of the shaft 18 and the teeth of the arm 28 being less than the distance from the axis to the point A and greater than the distance from the axis to the point B.

30 designates a cog-gear fixed to the upright axle 13 of the rear wheel 17 and adapted to mesh with the teeth of the cog-gear 26. The cog-gear 30 has a curving section 31, that extends from a point D to a point E, the point E being closer to the axle 13 than the point D. 32 is a toothed arm forming a part of the gear and adapted to mesh with the teeth of the arm 28 when the cog-gear 26 is manipulated to bring the two arms into coincident position. The arm 32 is provided with a straight edge 33, adapted to receive the corresponding straight edge 29 of the cog-gear 26 as the gears move to bring the two arms into engagement.

In the practical operation of a plow when the plow is turned to the right the entire plow pivots on the heel of the rear plow of the two in gang, and for this reason the forward or furrow wheel should turn into a position at right angles with the plows proper, so that the entire plow will be turned in the proper circle. When, however, the entire plow is turned to the left, it pivots on the point of the forward plow proper, which brings the pivotal point closer to the forward wheel, causing the forward wheel to describe a very small circle and places the pivotal point in an entirely-different position from that in turning the entire plow to the right. It is, in view of the facts just stated, requisite that the rear wheel 17 be moved into a different position relative to the forward or furrow wheel 2 when the plow is turned to the right from that when the plow is turned to the left. In order to occasion the difference, I construct the cog-gears 26 and 30 of the elliptic form shown, and the difference in movement between the forward and rear wheels is caused by reason of the axle of the rear wheel having a slow travel imparted to it as the tongue of the plow is turned to the right, at which time the portion of the toothed section 27 near its axis is in engagement with the longest portion of the section 31 of the cog-gear 30, whereas when the tongue is turned to the left the axle of the rear wheel receives its power from the portion of the section 27 most remote from its axis and in driving engagement with the portion of the section 31 nearest the axis of the last-named section. It is therefore apparent that when the tongue is turned to the left a greater speed is imparted to the axle 13 as the tongue approaches the limit of its swing, with the result that the rear wheel is moved a greater distance relatively than the forward wheel 2, so that said wheels are caused to partake of a position such that the entire plow will pivot on the point of the forward plow proper in the arc of a circle as it is turned, and the plows will be brought into the proper position with relation to the unplowed ground. As the entire plow is turned to the extreme left the sections 27 and 31 of the cog-gears become disengaged, the straight edge 29 rides in contact with the straight edge 33, and the toothed arms 28 and 32 come into engagement. These arms both extending to a much greater distance from the axes of the cog-gears than the point E of the cog-section 31, the power exerted by the cog-gear 26 upon the cog-gear 30 is greatly diminished as soon as the sections 27 and 31 are parted from engagement, and a slight variation from the proper swing of the plow-tongue does not materially affect movement of the axle of the rear wheel, the cog-gears in this position being practically at rest.

A further feature of my invention has reference to an adjustable toothed segment that receives the engagement of the dog of the plow-lifting lever. It frequently happens that in the use of a riding-plow it is discovered after laying off the land and making a few rounds the plow is either cutting too deep or not to a sufficient depth. When this is the case with a riding-plow having the lifting-lever arranged to engage a toothed segment immovably fixed to the plow-frame, the movement of the lever so that its dog will engage between another pair of segment-teeth causes too great a difference in the depth it is desired the plow is to cut. For the purpose of permitting accurate adjustment of the plow to the desired depth I utilize an adjustable toothed segment 34. (Seen in detail in Figs. VIII and X.) This segment is mounted on a pivot 35, carried by the main frame 1, is free at the end 36, and is adjustably connected to the frame at the end 37. The end 37 of the segment is enlarged and provided with an elongated opening 38 and interior teeth 39. The opening 38 is hid from view by the bolt-head in Fig. II. The teeth 39 mesh with the teeth of a wheel 40, mounted on a bolt 41, that passes through the frame 1 and is equipped with a nut 42. On removing the nut 42 the toothed wheel 40 may be removed and the toothed segment 34 moved to the proper adjustment forwardly or rearwardly, after which, upon the toothed wheel and nut being again replaced, the segment is securely held in the altered position and the lifting-lever is maintained correctly to afford the desired depth of cut of the plows.

I claim as my invention—

1. In a riding-plow, the combination with the forward and rear wheels and their axles, of elliptical gearing by which said rear wheel is turned, and means of connection between the axle of said forward wheel and said gearing, substantially as described.

2. In a riding-plow, the combination with the forward and rear wheels and their axles, of an elliptic gear carried by the rear-wheel axle, a shaft mounted on the plow-frame, an elliptical gear on said shaft arranged to engage the gear on said rear-wheel axle, and means of connection between the forward-wheel axle and said shaft, substantially as set forth.

3. In a riding-plow, the combination of the forward and rear wheels, and their axles, of a shaft carried by the plow-frame, a cog-gear carried by the rear-wheel axle, a cog-gear carried by said shaft adapted to intermesh with the first-mentioned cog-gear, said cog-gears each having a curved section extending from a point close to the axis of the gear to a point more remote therefrom, and means of connection between the forward-wheel axle and said shaft, substantially as described.

4. In a riding-plow, the combination of the forward and rear wheels, and their axles, of a shaft carried by the plow-frame, a cog-gear carried by the rear-wheel axle, a cog-gear carried by said shaft adapted to intermesh with the first-mentioned cog-gear, said cog-gears each having a curved section extending from a point close to the axis of the gear to a point more remote therefrom said gears also being provided with toothed arms terminating at greater distances from the axes of the gears than the closest approaches of said curved sections, and means of connection between the forward-wheel axle and said shaft, substantially as described.

5. In a riding-plow, the combination with the forward and rear wheels and their axles, of a shaft carried by the plow-frame, intermeshing elliptical gearing carried by said shaft and the rear-wheel axle, sprocket-wheels carried by the forward-wheel axle and said shaft, chains arranged in engagement with said sprocket-wheels, rods connected to said chains, and turnbuckles uniting said rods, substantially as and for the purpose set forth.

6. In a riding-plow, the combination with the plows proper, a lifting-lever, and means of connection between said plows and said lever; of a toothed segment pivoted to the plow-frame, said lever being provided with an opening containing teeth or corrugations, a toothed wheel arranged in said opening adapted to engage said teeth or corrugations, and means for clamping said wheel, substantially as set forth.

JOHN W. BROWN.

In presence of—
L. L. KLEIN,
E. S. THOMAS.